Oct. 20, 1936.  P. SECONDO  2,057,982
FRUIT WASHING MACHINE
Filed Aug. 28, 1934  3 Sheets-Sheet 2
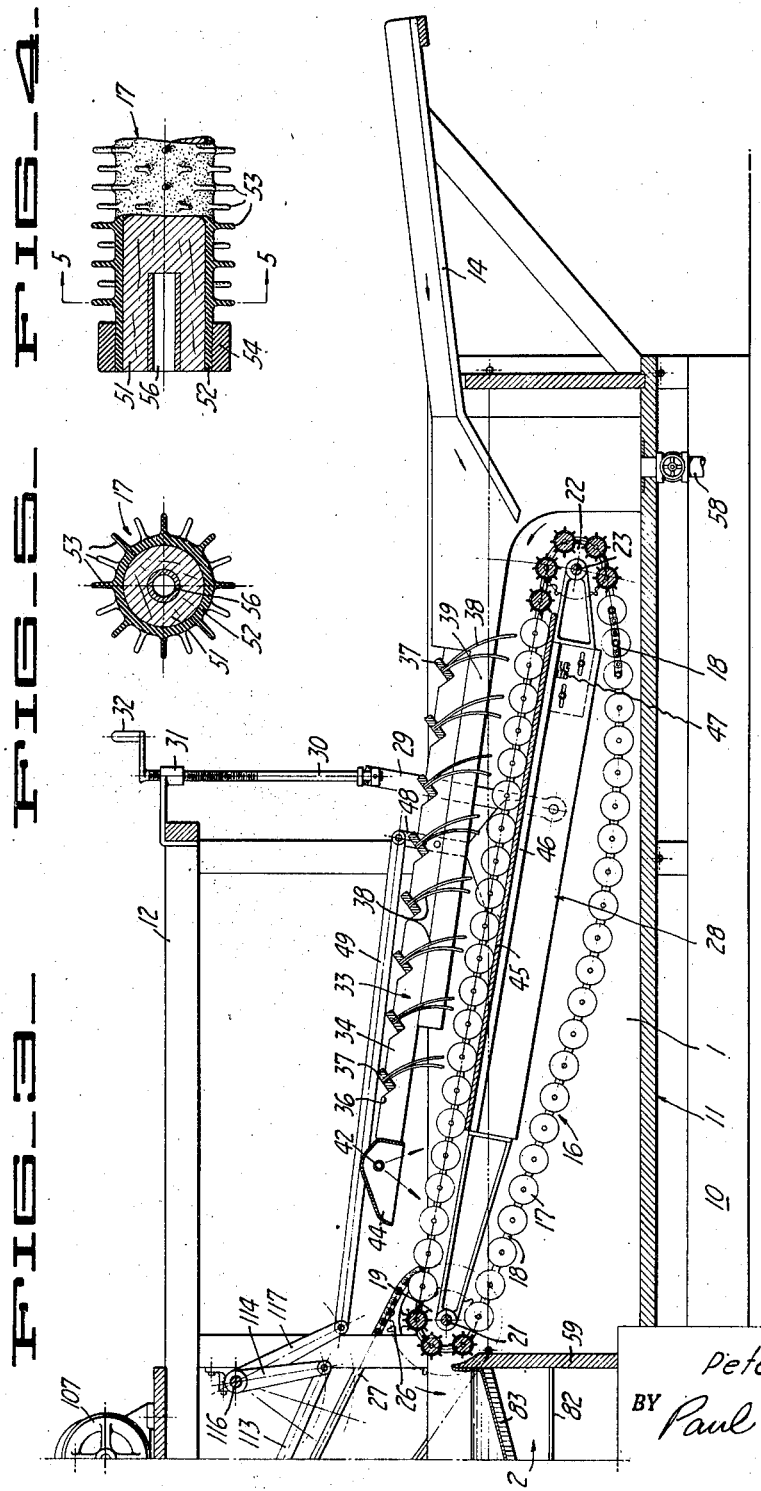
INVENTOR
Peter Secondo
BY
ATTORNEY

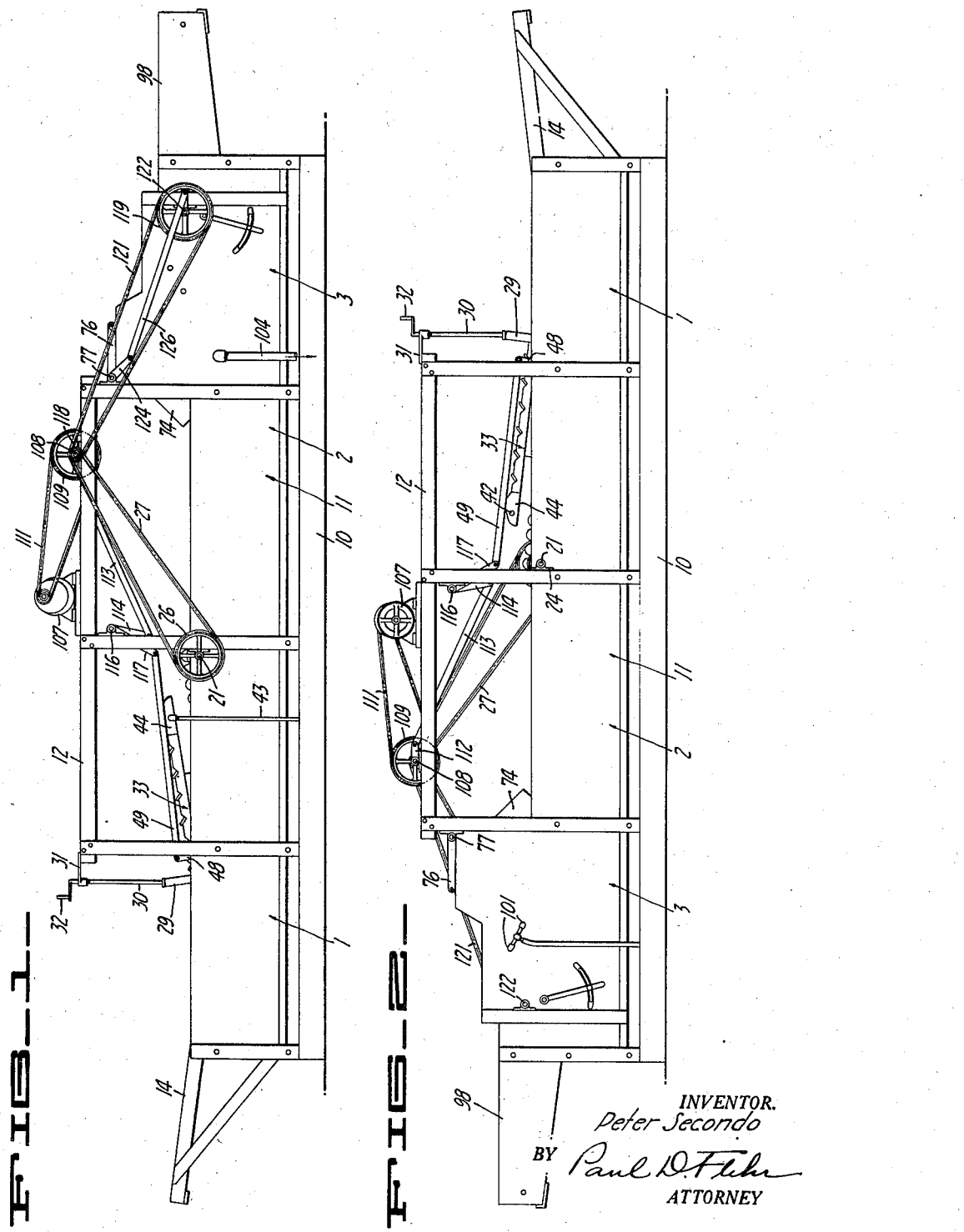

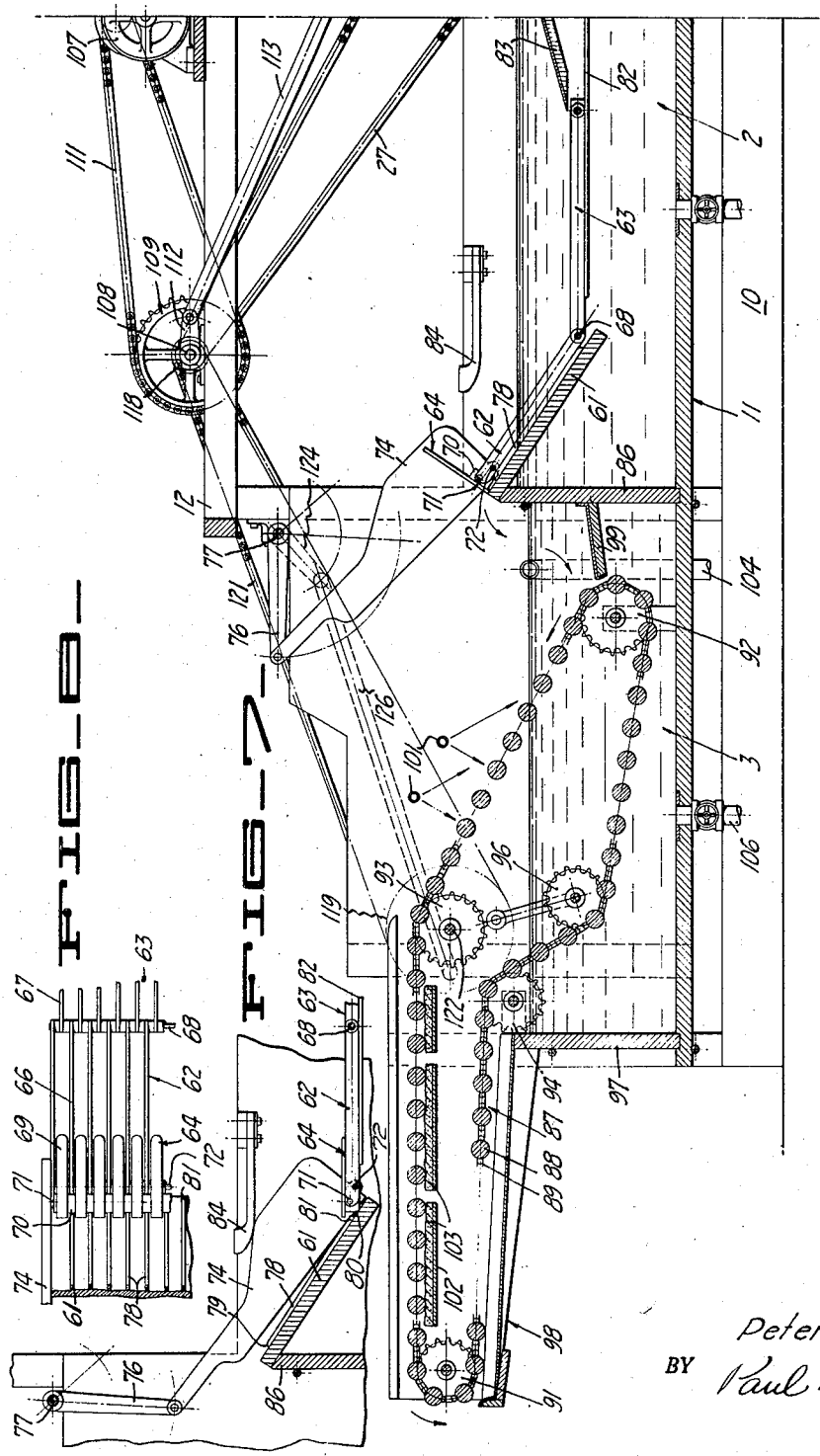

Patented Oct. 20, 1936

2,057,982

UNITED STATES PATENT OFFICE 2,057,982

FRUIT WASHING MACHINE

Peter Secondo, Watsonville, Calif.

Application August 28, 1934, Serial No. 741,788

6 Claims. (Cl. 146—194)

This invention relates generally to machines for the handling and treating of fruit, such as are employed in fruit packing houses.

It is a general object of the invention to provide a simple but effective machine of the above character which will perform all of the functions generally desired from such machines, such as a scrubbing or washing of the fruit, an immersion of the fruit in a bath of chemical-containing liquid for the removal of spray residue, and a final delivery of the fruit for packing.

More specifically, it is an object of the invention to provide a new and improved form of washing mechanism for a fruit handling machine, which will not require the use of pumping equipment, and which will effectively scrub the surfaces of the fruit, including natural surface indentations.

A further object of the invention is to provide a novel form of mechanism for recurrently removing fruit floating in a liquid bath, which is particularly adapted to be used where the water bath contains an acid or like chemical such as would corrode an ordinary conveyer.

Further objects of the invention will appear from the following description in which the preferred embodiment of the invention has been set forth in conjunction with the accompanying drawings.

Referring to the drawings:

Fig. 1 is a side elevational view, illustrating a machine incorporating the present invention.

Fig. 2 is a view of the machine, similar to Fig. 1 but looking at the other side.

Fig. 3 is an enlarged side elevational view, in cross-section, showing that end of the machine which incorporates the washing mechanism.

Fig. 4 is a side-elevational detail, partly in cross-section, showing a desirable construction for the rollers of the washing conveyer.

Fig. 5 is a cross-sectional detail taken along the line 5—5 of Fig. 4.

Fig. 6 is a side-elevational view, in cross-section, illustrating that end of the machine which is not included in Fig. 3, namely, the provision for subjecting the fruit to an acid bath and for removing the fruit for final delivery.

Fig. 7 is a cross-sectional detail, illustrating a part of the mechanism serving to recurrently deliver fruit from the acid bath.

Fig. 8 is a fragmentary plan view showing a part of the mechanism illustrated in Fig. 7.

Referring first to Figs. 1 and 2, the machine consists of a suitable base 10 which serves to support the operating parts. Carried by the base 10 there is a general tank structure 11 which is divided into sections 1, 2 and 3. It may be explained at this point that within tank section 1 the fruit is washed; in tank section 2 the fruit is subjected to a bath of water containing acid or like chemical for the removal of spray residue; and in tank section 3 the fruit is rinsed in clean water and removed for final delivery. In conjunction with the general tank structure 11 there is an overhead frame 12 for supporting certain parts of the driving means to be presently described.

The parts associated with tank section 1 can be best explained by referring to Fig. 3. At the front end of the machine there is an inclined apron 14, upon which the fruit to be treated can be delivered, and which serves to roll the fruit into the bath of water contained within tank section 1. Arranged within the tank, in such a manner as to be partially submerged, there is an endless conveyer 16. This conveyer is of the roller type, being formed of a plurality of parallel rollers 17 which have their ends journaled to sprocket chains 18. Two pairs of sprockets serve to carry this conveyer, sprockets 19 mounted upon shaft 21, and sprockets 22 mounted upon shaft 23. Shaft 21 is carried by suitable journals 24 (Fig. 2) adjacent the sides of the tank structure, and is adapted to be driven by sprocket 26 and chain 27. Extending intermediate the upper and lower front of the conveyer 16, there is a frame 28. The upper end of this frame is carried by shaft 21, and the lower end serves to carry shaft 23. Therefore it is evident that the free end of the conveyer, that is, the end which engages sprockets 22, can be raised to facilitate cleaning. To enable such raising of the conveyer, the sides of frame 28 are shown pivotally connected to a yoke 29, which in turn is connected to the lower end of a depending rod 30. This rod has threaded engagement with a bracket 31 which in turn is carried by the overhead frame 12. By turning crank 32, it is apparent that yoke 29 can be raised to a desired height.

Overlying the upper run of the conveyer 16 there is a rack 33 which carries elements for wiping over the surfaces of the fruit being conveyed. In the particular detail illustrated, this rack is formed by side strips 34, having their upper edges provided with step-like notches 36. Secured to the side strips 34, within the notches 36, are the cross slats 37. Cross slats 37 are arranged in pairs, and gripped between each pair are the wipers 38. I have found it convenient to form these wipers of strips of rubber having their upper edges gripped between the slats, and slit vertically to form a plurality of depending resilient fingers.

The rack 33 can be supported in any desired manner. For example, as illustrated, the side strips 34 rest upon the upper edges of side boards 39, which in turn are secured to the inner side walls of the tank section 1. Likewise, if desired, the entire rack 33 may be supported by resilient means such as springs, to enable it to automatically adjust itself in accordance with the positioning of the conveyer 16.

Before the fruit leaves conveyer 16 it is desirable that it be subjected to a spray of fresh water. For this purpose I have shown a spray pipe 42 disposed near the uppermost end of rack 33, and which can be connected to a source of water under pressure by means of the hose or pipe 43. To avoid undue splashing, this spray pipe can be enclosed by the guard or deflector 44.

When the conveyer is operating, sprockets 19 rotate in a counter-clockwise direction, as viewed in Fig. 3, so that the upper run of the conveyer moves upwardly out of the water. Therefore fruit, such as apples, delivered into tank section 1 from the apron 14, is picked up upon the lower end of the conveyer and is conveyed upwardly beneath the wipers 38. While the fruit is thus moving into contact with the wipers, it is desirable that it be rotated or tumbled in such a manner as to secure more effective wiping and scrubbing action. This can be accomplished by a means which serves to rotate the rollers 17 cyclically, in opposite directions, as they pass beneath the rack 33. For this purpose I provide a panel 45 which underlies the upper run of the conveyer. The side edges of this panel are shown guided upon strips 46, which in turn are carried by the side members of frame 28. The lower edges of strips 46 may be urged upwardly by suitable means, such as compression springs 47. As can best be explained after a description of the preferred type of rollers employed, the upper surface of panel 45 frictionally engages the overlying rollers 17, so that when the panel is reciprocated longitudinally of the upper run of the conveyer, the rollers are rotated periodically in opposite directions. To effect such reciprocation of the panel 45, the side edges of this panel are secured to upstanding arms 48, which in turn are connected to a reciprocating rod 49. The drive connection to rods 49 will be subsequently described. Preferably, but not of necessity, arms 48 can be connected to the sides of rack 33 as shown, whereby the rack is reciprocated in unison with rotation of rollers 17 in opposite directions.

Figs. 4 and 5 illustrate a desirable form of roller construction for the conveyer 16. In this instance, each roller is formed of a cylindrical core 51, of suitable material such as wood, which is provided with a surfacing 52 of resilient material such as soft resilient rubber. Molded integrally with the resilient rubber are the projecting pins or scrubbing fingers 53. These resilient pins or scrubbing fingers are arranged in spaced relationship and cover substantially the entire periphery of the roller.

At each end of a roller there is an annular ring or collar 54. Bushings 56 are fixed in the ends of the roller and serve to receive journal pins carried by the sprocket chains 18. Referring back to Fig. 3, it is evident that the peripheries of collars 54 frictionally engage the longitudinal edges of panel 45, whereby, when the panel is reciprocated, all of the rollers so engaged are periodically rotated in opposite directions.

Such rotation serves to tumble or rotate fruit being carried by the conveyer, in opposite directions, whereby all surfaces of the fruit, including indentations at the blossom and stem ends, are engaged by the resilient pins 53, and whereby all the surfaces are brought into contact with the wipers 38.

It is evident that the tank section 1 can be provided with a suitable overflow weir or like overflow means, to maintain a desired level of water. Likewise, a drain pipe 58 may be provided for draining out all of the water, thus facilitating cleaning.

The division between tank sections 1 and 2 is by virtue of the partition wall 59, which is arranged near the delivery end of conveyer 16. Thus, as articles of fruit are dropped from the upper end of conveyer 16 they fall into tank section 2. The water within this latter reservoir preferably contains a suitable acid or like chemical for removing any remaining spray residue. Since the operating parts coming into contact with this liquid should be non-corrodible, the use of endless conveyers for the removal of fruit therefrom is not practicable. I have therefore devised a novel form of mechanism for effecting the removal of fruit from tank section 2, which is constructed as follows:—At that end of the tank section 2 from which it is desired to remove the fruit, there is an apron 61 which slopes downwardly into the liquid. Arranged to operate over this apron there is an articulated structure formed of sections 62 and 63, in conjunction with a so-called "flipper" means 64. Sections 62 and 63 are formed of spaced wood slats 66 and 67, which have their adjacent ends interleaved and pivotally connected together by rod 68. Flipper means 64 is formed of a plurality of wood fingers 69, secured to a bar 70 which in turn has its ends pivotally connected to the slats 66, as indicated at 71. Fingers 69 are free to swing down into a position substantially as shown in Fig. 7, from the raised position shown in Fig. 6. For effecting the desired reciprocating movement of the flipper means 64 in conjunction with slat sections 62 and 63, members 74 are provided, which can be made of wood and which are shown paddle-like in contour. Two of these members are provided, and they are disposed adjacent the inner side walls of tank section 2 to operate over the apron 61. The upper ends of members 74 are pivotally connected to arms 76, which in turn are secured to oscillating shaft 77. Suitable drive means for oscillating shaft 77 will be presently explained. A pivotal connection between members 74 and the flipper means 64 can be conveniently effected by rod 72 which is located below the axis of pivot 71.

Trip means are associated with the flipper means 64, so that the fingers 69 are moved to a position substantially as shown in Fig. 6 as they are moved upwardly over the apron 61, and so that they are swung downwardly between slats 66 as members 74 move downwardly over the apron. Thus, I have shown spaced slats 78 which are secured to the upper face of apron 61, and which afford end abutments 79 and 81. When member 74 moves upwardly from the position shown in Fig. 7, the lower abutment 81 is engaged by the corner 80 on bar 70, whereby these fingers are caused to swing upwardly substantially at right angles to the general plane of apron 61. The fingers remain in such a raised position until they have been moved upwardly over the apron to substantially the position shown in Fig. 6. As member 74 moves downwardly to the position shown in Fig. 6, the corner 80 is again engaged by abutments 79, whereby the fingers again flip down before being again immersed in the liquid.

Slat sections 62 and 63 extend substantially the entire width of the tank section 2, and preferably function substantially as a false bottom for this reservoir. Thus, substantially horizontal guide shelves 82 are provided on the inner side walls of tank section 2, over which sections 62 and 63 are caused to travel. Likewise, the entrant end of tank section 2—that is, the end of the tank into which the fruit is delivered—is shown provided with a downwardly sloped, immersed apron 83, the lower end of which terminates short of the guide shelves 82. When members 74 are in their uppermost positions, as shown in Fig. 6, slat section 63 is substantially horizontal, and the end remote from apron 61 still underlies the lower edge of apron 83. When members 74 move downwardly, slat section 63 slides over shelves 82 beneath apron 83, and ultimately, when members 74 are in their lowermost position as shown in Fig. 7, both slat sections 62 and 63 are substantially horizontal. Therefore it is evident that these sections at all times form substantially a false bottom beneath the surface of the liquid and above the normal bottom of tank section 2. In order to insure a proper path of movement for members 74, spring buffers 84 can be provided. These buffers engage the upper edges of members 74, thus urging them towards apron 61.

While the operation of the mechanism in conjunction with tank section 2 is believed evident from the above description, it can be briefly reviewed as follows:—Fruit delivered from the upper end of conveyer 16 drops into the liquid in tank section 2 over the apron 83, and is treated by the liquid therein for removing spray residue. Crowding of the fruit, in conjunction with the fact that the fruit usually floats, causes general movement of the fruit toward the region of the apron 61. Assuming that members 74 are being continuously reciprocated, flipper fingers 69 repeatedly move upwardly from beneath the fruit, whereby a certain amount of the fruit is elevated and delivered over partition wall 86 into the next tank section 3. After each elevation operation, downward movement of members 74 is accompanied by a swinging down of the flipper fingers 69, whereby the fingers are again submerged without engagement with fruit, for the next elevating operation. Substantially all parts of this mechanism can be made of wood, and if any metal parts are employed they should be of a material which is not corroded by acid or like chemical.

The parts within tank section 3 are mainly for the purpose of finally delivering the fruit, and for effecting a certain amount of drying. Thus, an endless conveyer 87 is provided, which can likewise be formed of parallel and individually rotatable rollers 88, having their ends connected by sprocket chains 89. The sprocket chains operate over end sprackets 91 and 92, intermediate drive sprockets 93, sprockets 94 for supporting the lower run of the conveyer, and idler sprockets 96 to properly tension the conveyer. The delivery end of the conveyer is at an elevation with respect to the lower end engaging sprockets 92 and extends from the end wall 97 through the enclosure 98. Positioned near the lower end of the conveyer and immersed beneath the surface of the water, there is a baffle wall 99, which insures a proper pick-up of the fruit by the upper run of the conveyer. Sprockets 93 are driven in a counter-clockwise direction, whereby the upper run of the conveyer moves upwardly out of the water and then horizontally through the enclosure 98. Overlying the upper run of the conveyer immediately above the surface of the water, are the spray pipes 101 by means of which fresh rinse water may be sprayed upon the fruit for a final rinsing operation. Underlying that portion of the upper run of the conveyer between sprockets 91 and 93, are shelves 102 which carry water absorbent pads 103. These pads are engaged by the conveyer rollers passing over the same, whereby the conveyer rollers are rotated about their individual axes, and whereby excess water is drained from the same. The entire delivery end of this conveyer, including the enclosure 98, may be adjustable vertically, for convenience in delivering fruit to various elevations.

It is evident from the above description of conveyer 87 that as fruit is delivered into the receiving end of tank section 3, it is picked up by the upper run of the conveyer and passed beneath the rinsing spray pipes 101. Subsequently, as the fruit is carried between sprockets 93 and 91, the conveyer rollers carrying the same are rotated by virtue of contact with pads 103, thus causing a tumbling of the fruit and effecting removal of a considerable quantity of excess water. Ultimately the fruit is delivered from the end of the conveyer for packing. Tank section 3 can likewise be provided with an overflow pipe 104 and a drain pipe 106.

It is desirable to have all of the operating parts driven by a single electric motor 107, or like prime mover. Thus, a countershaft 108 is carried by the frame 12, and has a sprocket 109 which is driven by electric motor 107 through drive chains 111. Crank 112, secured to shaft 108, is pivotally connected to a link 113. The lower end of this link pivotally connects with an arm 114 which in turn is secured to a rock shaft 116. Arms 117 secured to this rock shaft pivotally connect with the upper ends of reciprocating bars 49, which, as previously explained, serves to effect cyclic rotation in opposite directions of the rollers forming a part of conveyer 16. Shaft 108 also carries a sprocket 118, which is connected to sprocket 119 by drive chain 121. Sprocket 119 is secured to shaft 122, and therefore serves to drive sprocket 93 for effecting operation of the conveyer 87.

Likewise carried by the frame 12 is the shaft 77 to which the arms 76 are connected. This shaft also carries an arm 124, having a pivotal connection with one end of link 126. The other end of this link has an eccentric connection with the shaft 122.

Operation of my machine as a whole can now be reviewed. The apples, or like fruit to be treated, are first dumped upon the apron 14 and permitted to roll into the adjacent end of tank section 1. As the fruit is picked up by the conveyer 16, the surfaces are scrubbed by virtue of contact with wipers 38, by contact with the resilient scrubbing fingers or pins 53 carried by the rollers, and by virtue of the tumbling action to which the fruit is subjected by virtue of the periodic rotation of the rollers 17 in opposite direction. After such scrubbing, the fruit is delivered into the tank section 2, where it is contacted with water containing an acid or like chemical for the removal of remaining spray residue. From this tank section the fruit is periodically elevated over apron 61 and delivered into the water contained in tank section 3. Here any remaining acid or like chemical is removed and the fruit is subjected to a final rinsing operation as it passes upwardly beneath the spray nozzles 101. As the fruit travels through the enclosure 98, it is again tumbled to effect drainage of excess water, and then it is finally delivered from the end of conveyer 87 for packing.

I claim:

1. In a fruit handling machine, a liquid-containing tank into which fruit can be delivered, and means for recurrently removing fruit from said tank, said last means including an inclined apron sloped downwardly into the tank at one end thereof, members having reciprocating movement over said apron, flipper fingers secured to said members for pivotal movement about a horizontal axis, whereby said fingers are recurrently moved into and out of the liquid, and trip means for tilting said fingers from a position in which the fingers extend parallel to the apron to a position in which they extend substantially at right angles to the apron, the fingers being substantially at right angles to the apron as they are being moved out of the liquid.

2. In a fruit handling machine, a liquid-containing tank into which fruit can be delivered, and means for recurrently removing fruit from said tank, said last means including an inclined apron at one end of the tank and sloped downwardly to extend into the liquid, members having reciprocating movement over said apron, flipper fingers secured to said members for pivotal movement on a horizontal axis whereby said fingers are recurrently immersed below the surface of the liquid and then moved out of the liquid, trip means for effecting automatic tilting of said fingers from a position in which they extend substantially parallel to the apron to a position in which they extend substantially at right angles to the apron, the fingers extending substantially at right angles to the apron while they are being moved upwardly out of the liquid, and an articulated structure likewise secured to said members and extending into the liquid within said tank, said articulated structure forming a false bottom for the tank below the surface of the liquid.

3. In a fruit handling machine, a liquid-containing tank adapted to receive fruit, an inclined apron at one end of the tank sloped downwardly to extend into the liquid within the tank, members having reciprocating movement over said apron, fruit elevating fingers secured to said members for pivotal movement on a horizontal axis, and trip means for swinging said fingers downwardly and substantially parallel to the apron at the beginning of a downward stroke of said members and for swinging said fingers to a position substantially at right angles to said apron at the beginning of an upstroke of said members.

4. In a fruit handling machine, a liquid-containing tank adapted to receive articles of fruit, an inclined apron at one end of the tank sloped downwardly to extend into the liquid, members having reciprocating movement over said apron, elevating fingers secured to said members for pivotal movement on a horizontal axis, trip means for swinging said fingers downwardly and substantially parallel to the apron at the beginning of a down stroke of said members and for swinging said fingers to a position substantially at right angles to said apron at the beginning of an upstroke of said members, and a structure forming a false bottom for said tank beneath the liquid within the same, one end of said structure being pivotally connected to said members on a horizontal axis adjacent to the first-mentioned horizontal axis.

5. In a fruit handling machine, a liquid-containing tank adapted to receive articles of fruit, an inclined apron at one end of the tank sloped downwardly to extend into the liquid, members having reciprocating movement over said apron, elevating fingers secured to said members for pivotal movement on a horizontal axis, trip means for swinging said fingers downwardly and parallel to the apron at the beginning of a down stroke of said members and for swinging said fingers to a position substantially at right angles to said apron at the beginning of an upstroke of said members, a structure formed of spaced parallel slats affording a false bottom for the tank beneath the surface of the liquid, and means serving to pivotally connect one end of said structure to said members on an axis parallel and adjacent to the pivotal axis of the elevating fingers, said elevating fingers at the limit of the downstroke of said members projecting below said structure.

6. In a fruit handling machine, a liquid-containing tank adapted to receive articles of fruit, an inclined apron at one end of the tank sloped downwardly to extend into the liquid, members having reciprocating movement over said apron, elevating fingers secured to said members for pivotal movement on a horizontal axis, trip means for swinging said fingers downwardly and parallel to the apron at the beginning of a downstroke of said members and for swinging said fingers to a position substantially at right angles to said apron at the beginning of an upstroke of said members, an articulated structure affording a false bottom for said tank below the surface of liquid within the same, said structure being formed of spaced slats extending in a direction away from said apron, and means serving to pivotally connect one end of said structure to said members on an axis parallel and adjacent to the pivotal axis of the elevating fingers, said elevating fingers at the limit of the downstroke of said members projecting below said structure, and being above said structure while being moved upwardly by said members.

PETER SECONDO.